United States Patent [19]

Freppel

[11] 4,340,703

[45] Jul. 20, 1982

[54] PROCESS FOR PREPARING BIMODAL OR MULTIMODAL POLYMERS OF CONJUGATED DIENES

[75] Inventor: Christian Freppel, Chamalieres, France

[73] Assignee: Compagnie Generale des Etablissements Michelin, Clermont-Ferrand, France

[21] Appl. No.: 251,978

[22] Filed: Apr. 6, 1981

[30] Foreign Application Priority Data

Apr. 9, 1980 [FR] France ............................... 80 08110

[51] Int. Cl.³ .................................................. C08F 2/40
[52] U.S. Cl. ..................................... 526/79; 525/232; 525/236; 526/66; 526/82
[58] Field of Search ............................ 526/79, 82, 66

[56] References Cited

U.S. PATENT DOCUMENTS

| | | | |
|---|---|---|---|
| 4,110,525 | 8/1978 | Zarauz | 526/177 |
| 4,112,210 | 9/1978 | Zarauz | 526/187 |
| 4,148,985 | 4/1979 | Zarauz | 526/177 |
| 4,148,986 | 4/1979 | Zarauz | 526/177 |
| 4,152,505 | 5/1979 | Zarauz | 526/187 |

*Primary Examiner*—Stanford M. Levin
*Attorney, Agent, or Firm*—Brumbaugh, Graves, Donohue & Raymond

[57] ABSTRACT

A process of preparing a bimodal or multimodal homopolymer of a conjugated diene or a bimodal or multimodal copolymer of a conjugated diene with another conjugated diene or with a vinyl aromatic compound consists in polymerizing the monomer(s) in a reaction medium at a temperature of between 20° C. and 200° C. in the presence of a catalyst system formed of the reaction product of:

(a) an organic compound of a metal of group 3A of the periodic classification of elements of the Mendeleev Table having one of the following formulas:

$M^1M^3R^1R^2R^3R^4$ $M^2(M^3R^1R^2R^3R^4)_2$ $M^3R^1R^2R^3$ $M^1OM^3R^1R^2$ with (b) at least one electron-donor compound containing at least one heteroatom, and adding hydrogen as a modifying agent to the reaction medium during the course of the polymerization reaction.

7 Claims, 8 Drawing Figures

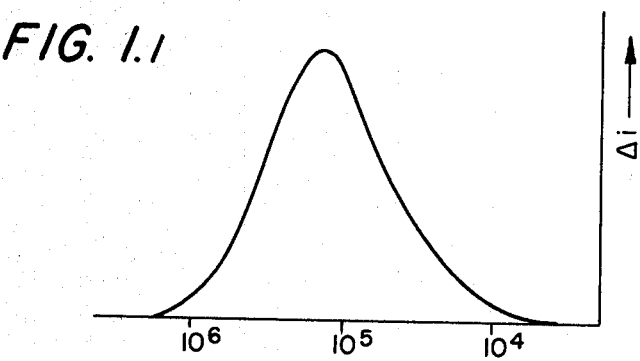
FIG. 1.1
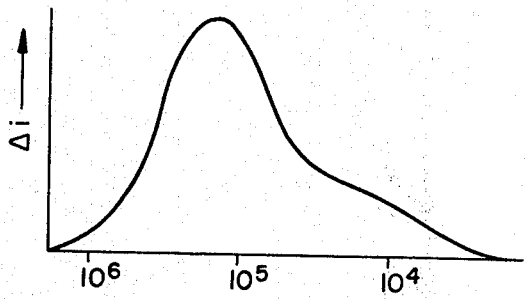
FIG. 1.2
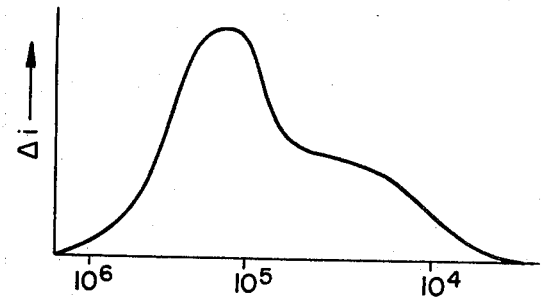
FIG. 1.3
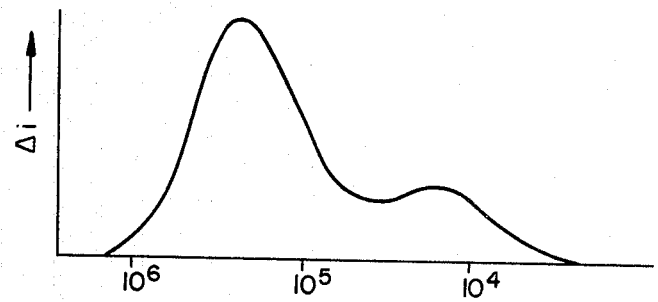
FIG. 1.4

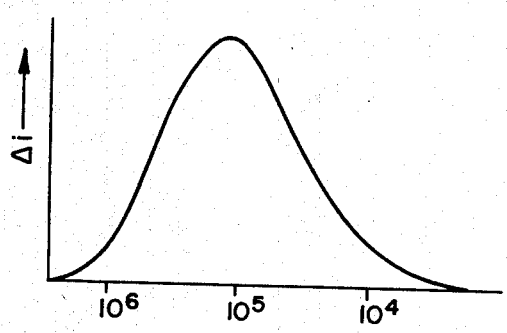
FIG. 2.1
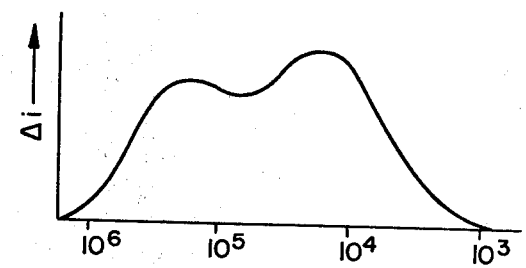
FIG. 2.2
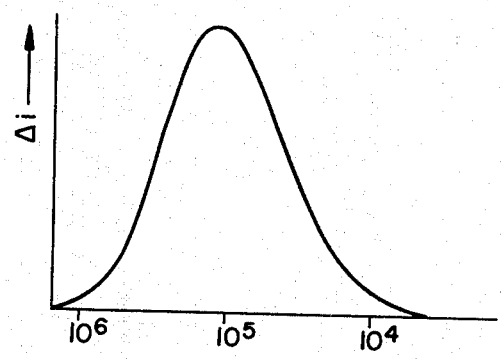
FIG. 3.1
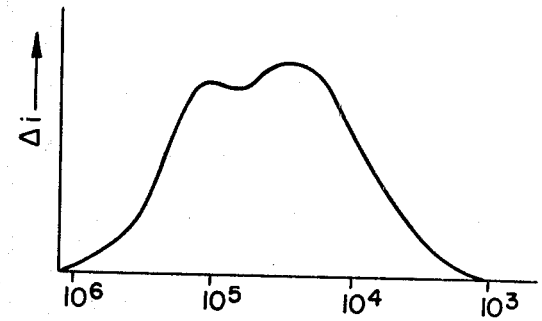
FIG. 3.2

PROCESS FOR PREPARING BIMODAL OR MULTIMODAL POLYMERS OF CONJUGATED DIENES

The object of the present invention is a process which makes it possible to modify the molecular weight distribution upon the synthesis of a homopolymer of a conjugated diene or a copolymer of a conjugated diene with another conjugated diene or with a vinyl aromatic compound.

From West German patent application No. 26 07 721 (which corresponds to U.S. Pat. Nos. 4,110,525, 4,112,210, 4,148,985, 4,148,986 and 4,152,505) it is known to prepare a homopolymer of a conjugated diene or a copolymer of a conjugated diene with another conjugated diene or with a vinyl aromatic compound having extremely different microstructures and a monomodal distribution of the molecular weights by means of a catalyst system formed of the reaction product of:

(a) an organic compound of a metal of group 3A of the periodic classification of elements of the Mendeleev Table having one of the following formulas:

$M^1M^3R^1R^2R^3R^4$
$M^2(M^3R^1R^2R^3R^4)_2$
$M^3R^1R^2R^3$
$M^1OM^3R^1R^2$ in which $M^1$ represents an alkali metal, $M^2$ represents an alkaline earth metal, $M^3$ represents a metal of group 3A, $R^1$, $R^2$, $R^3$ represent an alkyl or aralkyl radical and $R^4$ represents either an alkyl or aralkyl radical or a radical XB in which X represents an oxygen, sulfur or nitrogen atom and B is an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal.

It is desirable to have means which make it possible to modify and regulate the distribution of the molecular weights of the homopolymer of a conjugated diene or a copolymer of a conjugated diene with another conjugated diene or with a vinyl aromatic compound for a number of industrial uses of these products, since the modification of the molecular weight distribution makes it possible to improve greatly certain properties such as, for instance, the machineability, the cold flow, the raw coherence, the raw tackiness, etc., without penalizing the other properties.

It is known to the man skilled in the art that it is possible to broaden the molecular weight distribution and obtain bimodal or multimodal polymers by mixing together several polymers of different viscosity.

However, such a process has the drawback of requiring the separate synthesis of several polymers of different viscosities, which results in problems of reproducibility of the process, requires very large quantities of catalyst, results in long periods of time and finally makes this process uninteresting both from a technical standpoint and from an economic standpoint.

It is also known to modify the molecular weight distribution of homopolymers and copolymers in processes carried out either batchwise or continuously by breaking up the amount of catalyst necessary and adding it at different times during the course of the homopolymerization or copolymerization. However, such a manner of operation, which also requires very large amounts of catalyst, which are larger the greater the desired broadening of the molecular weight distribution is, is therefore also very expensive. Furthermore, it would be extremely difficult to carry out industrially.

The object of the present invention is to remedy these drawbacks by providing a process which is economically more interesting and which makes it possible easily to modify and regulate the molecular weight distribution during the course of the synthesis of a homopolymer of a conjugated diene or a copolymer of a conjugated diene with another conjugated diene or with a vinyl aromatic compound and to obtain a bimodal or multimodal homopolymer or copolymer.

The applicant has unexpectedly found that it is possible to achieve this purpose when the homopolymerization of the conjugated diene or the copolymerization of the conjugated diene with another conjugated diene or with a vinyl aromatic compound by the use of the catalyst systems described above is effected in the presence of a modifying agent which is not a polymerization initiator.

Thus, the present invention concerns a process of preparing a homopolymer of a conjugated diene or a copolymer of a conjugated diene with another conjugated diene or with a vinyl aromatic compound, whether bimodal or multimodal, which consists in polymerizing the monomer(s) in a reaction medium at a temperature of between 20° C. and 200° C. in the presence of a catalyst system formed of the reaction product of:

(a) an organic compound of a metal of group 3A of the periodic classification of elements of the Mendeleev Table having one of the following formulas:

$M^1M^3R^1R^2R^3R^4$
$M^2(M^3R^1R^2R^3R^4)_2$
$M^3R^1R^2R^3$
$M^1OM^3R^1R^2$ in which $M^1$ represents an alkali metal, $M^2$ represents an alkaline earth metal, $M^3$ represents a metal of group 3A, $R^1$, $R^2$, $R^3$ represent an alkyl or aralkyl radical and $R^4$ represents either an alkyl or aralkyl radical or a radical XB in which X represents an oxygen, sulfur or nitrogen atom and B represents an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal, characterized by adding hydrogen as a modifying agent to the reaction medium during the course of the polymerization reaction.

The periodic classification of elements of the Mendeleev Table referred to herein is that given in the 59th edition of the "Handbook of Chemistry and Physics."

This process makes it possible to modify the molecular weight distribution as desired and to obtain improved properties of raw tackiness, raw coherence and machineability without requiring additional amounts of catalyst and without, at the same time, penalizing the other properties.

The process of the invention makes it possible to obtain homopolymers and copolymers having bimodal or multimodal molecular weight distributions. The fraction or fractions obtained after addition of the modifying agent are of low molecular weight. Furthermore, the average molecular weights of said fraction or fractions of low molecular weight as well as the quantity of these low molecular weights are a function of the amount of the modifying agent added and of the time when this modifying agent is added during the course of the polymerization reaction.

By selecting the amount to be added and the time of the addition as a function of the percentage of conversion of the monomers at the time in question as compared with the final conversion percentage, it is possible to prepare bimodal or multimodal homopolymers and copolymers, the quantity of the high and low molecular weights of which as well as the respective average molecular weights of these high and low molecular weights can be regulated as desired.

It is desirable to use amounts of hydrogen solubilized in the reaction medium of between 0.1 and 100 ppm. The larger the amount of solubilized hydrogen, the lower the molecular weight of the low molecular weights will be.

The hydrogen is added during the course of the polymerization reaction and preferably when the conversion of the monomers is between 20% and 90%. The polymerization process can be conducted in bulk or in solution in a hydrocarbon solvent either batchwise or continuously. In the latter case, one operates in two or more reactors placed in series at identical or different polymerization temperatures. Depending on the extent of the effect desired, the hydrogen is added in one or more portions.

In the polymerization process of the invention aliphatic solvents, such as hexane and heptane, or aromatic solvents, such as benzene and toluene, can be used as a hydrocarbon solvent.

The organometallic compounds of a metal of group 3A which are particularly suitable as components of the catalyst system are those in which the group 3A metal is boron, aluminum, gallium, indium and thallium and those in which the alkali metal is lithium, sodium or potassium and those in which the alkaline earth metal is magnesium, calcium, strontium or barium. For example, the following compounds may be mentioned:

$Al(CH_3)_3$, $Al(C_2H_5)_3$, $Al(i-C_4H_9)_3$, $Li[Al(C_2H_5)_4]$, $Na[Al(C_2H_5)_4]$, $K[Al(C_2H_5)_4]$, $Li[Al(C_2H_5)_3O C_2H_5]$,
$Li[Al(C_2H_5)_3O Al(C_2H_5)_2]$, $Mg[Al(C_2H_5)_4]_2$, $C_2H_5Mg Al(C_2H_5)_4$,
$Ca[Al(C_2H_5)_4]_2$, $Sr[Al(C_2H_5)_4]_2$, $Ba[Al(C_2H_5)_4]_2$, $Ba[Al(C_2H_5)_3O C_2H_5]_2$, $Ba[Al-(iso\ C_4H_9)_4]_2$,
$Li\ O\ Al(C_2H_5)_2$, $Na\ O\ Al(C_2H_5)_2$, $B(CH_3)_3$, $B(C_2H_5)_3$,
$Li\ B(C_2H_5)_4$, $Li\ B(C_2H_5)_3C_4H_9$, $Ga(C_2H_5)_3$, $In(C_2H_5)_3$, $Tl(C_2H_5)_3$.

As aprotic polar compounds there are particularly suitable the ethers and particularly the cyclic ethers, such as tetrahydrofuran and dioxane, and the corresponding thioethers, the tertiary amines such as N,N,N',N'-tetramethyl-ethylene-diamine, the aromatic amines and, in particular, the derivatives of pyridine and the corresponding oxides, the phosphorus compounds such as phosphines and their oxides, the phosphites, the phosphoroamides and, in particular, hexamethylphosphorotriamide, the ketones and particularly acetone, the nitriles and particularly acetonitrile, the aldehydes, the esters, the amides, the nitroaliphatic or aromatic compounds, the sulfoxides and particularly dimethylsulfoxide, the sulfones and the sulfites.

As protic polar compounds there are suitable, in particular, water, the alcohols and particularly methanol, the primary or secondary amines and the thiols.

As compounds formed of the reaction products of protic polar compounds with an alkali metal or with an alkaline earth metal there are particularly suitable the alcoholates and the phenates of an alkali metal or alkaline earth metal, the alkali metal or alkaline earth mercapto- and thio-phenates as well as the ether-alcoholate and amine-alcoholate compounds.

The process of the invention is particularly suitable for the homopolymerization of a conjugated diene or the copolymerization of a conjugated diene with another conjugated diene or with a vinyl aromatic compound.

As representative examples of conjugated dienes there are suitable, in particular, butadiene-1,3, isoprene, 2,3-dimethyl-butadiene-1,3, pentadiene-1,3, 2-methyl-pentadiene-1,3 and 2,4-hexadiene.

As representative examples of vinyl aromatic compounds there are suitable, in particular, styrene, ortho-, meta- and para-methylstyrene, "vinyl toluene", the di- and poly-methylstyrenes, p-tertiobutylstyrene, the vinyl naphthalenes, the methoxystyrenes, the halostyrenes, vinyl mesitylene and divinyl benzene.

The following nonlimitative examples are given by way of illustration of the invention. In these examples, the inherent viscosities are established at 25° C. in a 1 g./liter solution in toluene; the concentrations of compounds constituting the catalyst system are expressed in micromols per 100 g. of monomers. The percentages of 1,2 and trans linkages are expressed with respect to the polybutadiene portion and the percentage of styrene is expressed with respect to the total amount of copolymer obtained.

The time elapsed between the start of the polymerization reaction and the moment when the modifying agent is added is designated in the examples as "elapsed time" and the percentage of conversion reached at the time of the addition of the modifying agent is designated by "% conv."

BRIEF DESCRIPTION OF THE DRAWINGS

The FIGURES of the drawing show the distribution of the molecular weights of the homopolymers or copolymers obtained at the end of the polymerization reaction which was obtained by gel permeation chromatography. The molecular weights are shown on the abscissa and the refraction index difference $\Delta i$ on the ordinate.

EXAMPLE 1

Four tests were carried out. 68 g. of toluene as solvent and 13.6 g. of monomers comprising 77% by weight butadiene and 23% by weight styrene were introduced into 250 ml. Steinie bottles under nitrogen pressure. The catalyst system formed of $LiAl(C_2H_5)_3C_4H_9$ and $[C_2H_5(OCH_2CH_2)_2O]_2Ba$ was then added in the order indicated. The bottles were placed in a tank maintained thermostatically at 80° C. in which they were agitated.

In Tests 2, 3 and 4, hydrogen was added during the course of the polymerization in such an amount that the amount of solubilized hydrogen was 1.5, 3 and 5 ppm., respectively.

At the end of 1¾ hours all the polymerization reactions were stopped by the addition of methanol and the copolymers were recovered in conventional manner.

The results are set forth in Table I and in FIGS. 1.1–1.4.

The larger the amount of solubilized hydrogen, the lower the molecular weight of the low molecular weights.

EXAMPLE 2

Two tests were carried out. 68 g. of toluene as solvent and 17.6 g. of monomers comprising 25% by weight styrene and 75% by weight butadiene were introduced into 250 ml. Steinie bottles under nitrogen pressure.

The catalyst system formed of $Ba[Al(C_2H_5)_4]_2$ and tetrahydrofuran (THF) was then added. The bottles were placed in a tank maintained thermostatically at 80° C. in which they were agitated.

In Test 2, hydrogen was added during the course of the polymerization in such an amount that the amount of solubilized hydrogen was 5 ppm.

At the end of two hours, all the polymerization reactions were stopped by the addition of methanol and the copolymers were recovered in conventional manner.

The results are set forth in Table II and in FIGS. 2.1–2.2

EXAMPLE 3

Two tests were carried out. 68 g. of toluene as solvent and 17.5 g. of butadiene were introduced into 250 ml. Steinie bottles under nitrogen pressure. The catalyst system formed of $Ba[Al(C_2H_5)_4]_2$ and lithium ethyl diglycolate—$C_2H_5(OCH_2CH_2)_2O$ Li—was then added. The bottles were placed in a tank maintained thermostatically at 70° C. in which they were agitated.

In Test 2, hydrogen was added during the couse of the polymerization in such an amount that the amount of solubilized hydrogen was 5 ppm.

At the end of two hours, all the polymerization reactions were stopped by addition of methanol and the homopolymers were recovered in conventional manner.

The results are set forth in Table III and in FIGS. 3.1–3.2.

TABLE I

| Test | Catalyst System LiAlR$_4$ | Catalyst System Ba(OR)$_2$ | Addition of H$_2$ Elapsed Time | Addition of H$_2$ % Conv. at Elapsed Time | Addition of H$_2$ Amount of Solubilized H$_2$ in ppm. | % Final Conversion | Copolymer Viscosity | Copolymer % 1,2 | Copolymer % trans. | Copolymer % Styrene | Drawing Fig. |
|---|---|---|---|---|---|---|---|---|---|---|---|
| 1 | 1294 | 588 | | | | 75 | 2.8 | 4.1 | 80 | 13 | 1.1 |
| 2 | 1294 | 588 | 45 min. | 55 | 1.5 | 77 | 2.5 | 4.1 | 80 | 14 | 1.2 |
| 3 | 1294 | 588 | 45 min. | 55 | 3 | 75 | 2.4 | 4.1 | 80 | 13 | 1.3 |
| 4 | 1294 | 588 | 45 min. | 55 | 5 | 78 | 2.2 | 4.2 | 80 | 14 | 1.4 |

TABLE II

| Test | Catalyst System Ba[Al(C$_2$H$_5$)$_4$]$_2$ | Catalyst System THF | Addition of H$_2$ Elapsed Time | Addition of H$_2$ % Conv. at Elapsed Time | Addition of H$_2$ Amount of Solubilized H$_2$ in ppm. | % Final Conversion | Copolymer Viscosity | Copolymer % 1,2 | Copolymer % trans. | Copolymer % Styrene | Drawing Fig. |
|---|---|---|---|---|---|---|---|---|---|---|---|
| 1 | 1140 | 4570 | | | | 83 | 2.16 | 6 | 75 | 13 | 2.1 |
| 2 | 1140 | 4570 | 50 min. | 35 | 5 | 83 | 1.29 | 6 | 74 | 14 | 2.2 |

TABLE III

| Test | Catalyst System Ba[Al(C$_2$H$_5$)$_4$]$_2$ | Catalyst System ROLi | Addition of H$_2$ Elapsed Time | Addition of H$_2$ % Conv. at Elapsed Time | Addition of H$_2$ Amount of Solubilized H$_2$ in ppm. | % Final Conversion | Viscosity | % 1,2 | % trans. | Drawing Fig |
|---|---|---|---|---|---|---|---|---|---|---|
| 1 | 1500 | 3000 | | | | 80 | 2.3 | 4 | 80 | 3.1 |
| 2 | 1500 | 3000 | 30 min. | 35 | 5 | 78 | 1.28 | 4 | 80 | 3.2 |

What is claimed is:

1. A process of preparing a bimodal or multimodal homopolymer of a conjugated diene or a bimodal or multimodal copolymer of a conjugated diene with another conjugated diene or with a vinyl aromatic compound, consisting in polymerizing the monomer(s) in a reaction medium at a temperature of between 20° C. and 200° C. in the presence of a catalyst system formed of the reaction product of:

(a) an organic compound of a metal of group 3A of the periodic classification of elements of the Mendeleev Table having one of the following formulas:

$M^1M^3R^1R^2R^3R^4$
$M^2(M^3R^1R^2R^3R^4)_2$
$M^3R^1R^2R^3$
$M^1OM^3R^1R^2$ in which $M^1$ represents an alkali metal, $M^2$ represents an alkaline earth metal, $M^3$ represents a metal of group 3A, $R^1$, $R^2$, $R^3$ represent an alkyl or aralkyl radical and $R^4$ represents either an alkyl or aralkyl radical or a radical XB in which X represents an oxygen, sulfur or nitrogen atom and B represents an alkyl or aralkyl radical or a radical $M^3(R^5R^6)$ in which $R^5$, $R^6$ represent an alkyl or aralkyl radical, with (b) at least one electron-donor compound containing at least one heteroatom selected from the group consisting of aprotic polar compounds, protic polar compounds and compounds formed of the reaction products of protic polar compounds with an alkali metal or with an alkaline earth metal, characterized by adding hydrogen as a modifying agent to the reaction medium during the course of the polymerization reaction.

2. A process according to claim 1, characterized by the fact that the amount of hydrogen solubilized in the reaction medium is between 0.1 and 100 ppm.

3. A process according to claim 1 or 2, characterized by the fact that the catalyst system is formed of the reaction product of $LiAl(C_2H_5)_3C_4H_9$ with $[C_2H_5(OCH_2CH_2)_2O]_2Ba$.

4. A process according to claim 1 or 2, characterized by the fact that the catalyst system is formed of the reaction product of $Ba[Al(C_2H_5)_4]_2$ with tetrahydrofuran.

5. A process according to claim 1 or 2, characterized by the fact that the catalyst is formed of the reaction product of $Ba[Al(C_2H_5)_4]_2$ with lithium ethyl diglycolate.

6. A process according to claim 1, characterized by the fact that the polymerization is conducted in a hydrocarbon solvent.

7. A process according to claim 6, characterized by the fact that the polymerization is conducted continuously.

\* \* \* \* \*